(12) United States Patent
Lim et al.

(10) Patent No.: US 9,678,622 B2
(45) Date of Patent: Jun. 13, 2017

(54) TERMINAL FOR SUPPORTING ICON OPERATION AND ICON OPERATION METHOD

(71) Applicant: Samsung Electronics Co., Ltd., Gyeonggi-do (KR)

(72) Inventors: Kyungsoo Lim, Gyeonggi-do (KR); Suckho Seo, Gyeonggi-do (KR); Kisuh Ahn, Seoul (KR); Hyejung Yang, Gyeonggi-do (KR); Eunhee Rhim, Gyeonggi-do (KR); Jinha Jun, Seoul (KR); Siejoon Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 641 days.

(21) Appl. No.: 13/856,814

(22) Filed: Apr. 4, 2013

(65) Prior Publication Data

US 2013/0268885 A1  Oct. 10, 2013

(30) Foreign Application Priority Data

Apr. 4, 2012 (KR) ........................ 10-2012-0035032

(51) Int. Cl.
*G06F 3/0481* (2013.01)
*H04M 1/725* (2006.01)

(52) U.S. Cl.
CPC .... *G06F 3/04817* (2013.01); *H04M 1/72586* (2013.01); *G06F 2203/04804* (2013.01)

(58) Field of Classification Search
CPC .......... G06F 3/00; G06F 3/048; G06F 3/0481; G06F 3/0482; G06F 3/04817; G06F 9/4443
See application file for complete search history.

(56) References Cited

U.S. PATENT DOCUMENTS

| | | | | |
|---|---|---|---|---|
| 5,420,975 A | * | 5/1995 | Blades | G06F 3/0482 715/811 |
| 5,596,694 A | | 1/1997 | Capps | |
| 5,737,557 A | * | 4/1998 | Sullivan | G06F 3/0481 715/765 |
| 5,852,440 A | * | 12/1998 | Grossman | G06F 3/0481 715/811 |
| 6,958,749 B1 | | 10/2005 | Matsushita et al. | |
| 7,523,410 B2 | * | 4/2009 | Rekimoto | G06F 17/30067 715/764 |
| 7,574,665 B2 | * | 8/2009 | Cortright | G06F 3/04847 715/768 |
| 8,683,383 B2 | * | 3/2014 | Ishiguro | H04N 5/44543 715/728 |
| 2002/0160817 A1 | | 10/2002 | Salmimaa et al. | |
| 2003/0098892 A1 | | 5/2003 | Hiipakka | |
| 2004/0267600 A1 | | 12/2004 | Horvitz | |
| 2006/0143574 A1 | | 6/2006 | Ito et al. | |

(Continued)

FOREIGN PATENT DOCUMENTS

| | | |
|---|---|---|
| JP | 07-110754 | 4/1995 |
| KR | 20080077798 | 8/2008 |
| KR | 1020090033551 | 4/2009 |

*Primary Examiner* — Xiomar L Bautista
(74) *Attorney, Agent, or Firm* — The Farrell Law Firm, P.C.

(57) ABSTRACT

Methods and apparatus are provided for an icon operation. A signal for designating a preset non-use period is received. An icon is output in a display format according to a non-use history of the icon and based on the preset non-use period.

19 Claims, 10 Drawing Sheets

(56) References Cited

U.S. PATENT DOCUMENTS

| | | |
|---|---|---|
| 2006/0218503 A1* | 9/2006 | Matthews ............. G06F 9/4443 715/779 |
| 2007/0083827 A1 | 4/2007 | Scott et al. |
| 2007/0298843 A1 | 12/2007 | Kwon |
| 2008/0052639 A1 | 2/2008 | Chun et al. |
| 2008/0126991 A1* | 5/2008 | Kang ................ H04M 1/72566 715/835 |
| 2008/0155428 A1 | 6/2008 | Lee |
| 2008/0163053 A1* | 7/2008 | Hwang ............... G06F 3/04886 715/702 |
| 2008/0313567 A1* | 12/2008 | Sabin .................... G06F 3/0481 715/835 |
| 2009/0019394 A1 | 1/2009 | Sekimoto et al. |
| 2009/0313544 A1* | 12/2009 | Wood ................ H04M 1/72544 715/716 |
| 2011/0191611 A1 | 8/2011 | Boni ang gaw go et al. |
| 2011/0289438 A1* | 11/2011 | Hwang ............. H04M 1/27455 715/764 |
| 2012/0015693 A1* | 1/2012 | Choi ................ H04M 1/72566 455/566 |
| 2012/0060094 A1* | 3/2012 | Irwin ................ H04N 21/4314 715/719 |
| 2012/0140255 A1* | 6/2012 | Tanaka .................... G06F 9/445 358/1.13 |
| 2012/0198547 A1* | 8/2012 | Fredette .................... G06F 8/34 726/19 |
| 2012/0278765 A1 | 11/2012 | Kuwahara |
| 2013/0111406 A1* | 5/2013 | Gebhart ................ G06F 3/0487 715/823 |
| 2013/0283191 A1* | 10/2013 | Finn ....................... A63F 13/12 715/757 |

* cited by examiner

TERMINAL FOR SUPPORTING ICON OPERATION AND ICON OPERATION METHOD

PRIORITY

This application claims priority under 35 U.S.C. §119(a) to a Korean Patent Application filed on Apr. 4, 2012 in the Korean Intellectual Property Office and assigned Ser. No. 10-2012-0035032, the entire disclosure of which is incorporated herein by reference.

BACKGROUND OF THE INVENTION

1. Field of the Invention

The present invention relates generally to an icon operation method in a terminal, and more particularly, to a terminal that supports an icon operation capable of intuitively processing icons that are not used from among icons in a terminal, and an icon operation method.

2. Description of the Related Art

A function of a terminal is not limited to a function of a phone. New functions capable of storing various information, such as, for example, a schedule or a phone number of a user, and serving as an electronic dictionary or an electronic calculator, have been added. In addition, a range of functions for the terminal has increased in that information searches, electronic mail use, and an on-line gaming through an Internet connection are possible by loading a wireless network arrangement in a terminal. Since various functions of the terminal are required, the icons of the terminal have become more numerous and complicated. Thus, additional time is required for a user to find a desired icon.

SUMMARY OF THE INVENTION

The present invention has been made to address at least the above problems and/or disadvantages and to provide at least the advantages described below. Accordingly, an aspect of the present invention provides an icon operation method capable of rapidly and intuitively managing a plurality of icons, and a terminal for supporting the same.

In accordance with an aspect of the present invention, an icon operation method in a terminal is provided. A signal for designating a preset non-use period is received. An icon is output in a display format according to a non-use history of the icon and based on the preset non-use period.

In accordance with another aspect of the present invention, a terminal is provided for supporting an icon operation. The terminal includes a display unit outputting an icon display screen including at least one icon. The terminal also includes an input unit generating a signal for designating a preset non-use period for the at least one icon. The terminal further includes a controller controlling such that an icon is outputted in a display format according to a non-use history of the icon and based on the preset non-use period.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numbers although they are illustrated in different drawings. Detailed descriptions of constructions or processes known in the art may be omitted to avoid obscuring the subject matter of the present invention.

Figure 1:
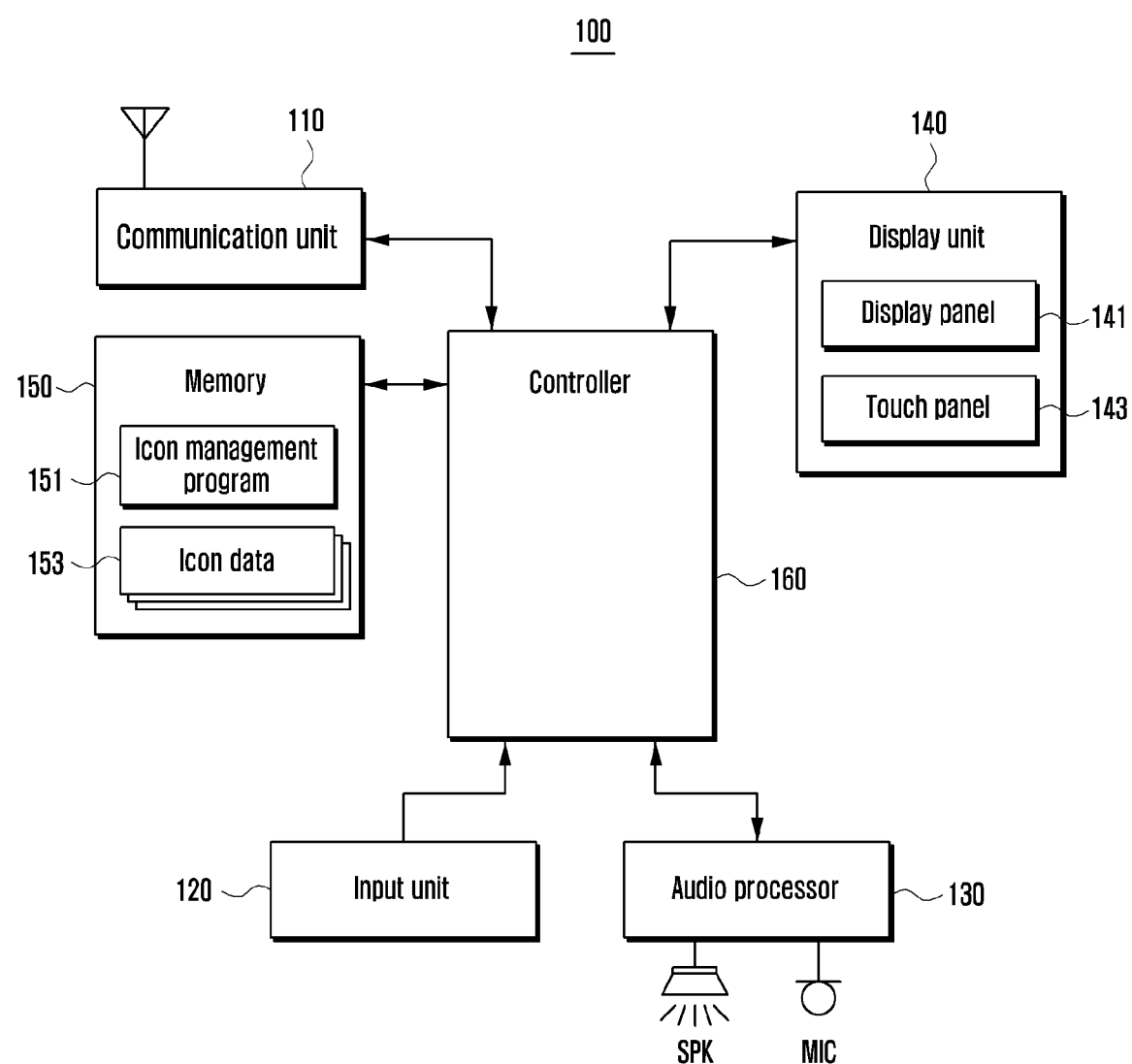
FIG. 1 is a block diagram illustrating a configuration of a terminal for supporting an icon operation, according to an embodiment of the present invention.

FIG. 1 is a block diagram illustrating a configuration of a terminal for supporting an icon operation function, according to an embodiment of the present invention Referring to FIG. 1, a terminal 100 of an embodiment of the present invention includes a communication unit 110, an input unit 120, an audio processor 130, a display unit 140, a memory 150, and a controller 160.

The terminal 100, which has a construction as described above, may provide icons to a schedule page outputted on the display unit 140 so that a user may select various applications (hereinafter referred to as 'Apps') stored in the memory 150. During this procedure, the terminal 100 may display non-use icons differently according to a non-use history and based on a designated preset non-use period. Accordingly, the terminal 100 allows a user to intuitively confirm a non-use history with respect to non-use icons, and icons may be easily managed. In addition, the terminal 100 removes icons from the specific page, when a specific page designated preset non-use period elapses for those icons, and discards these icons to a warehouse page. The terminal 100 may display the icons discarded to the warehouse page differently based on an additionally designated preset non-use period, and may remove icons and corresponding Apps when an additional preset non-use period elapses for those icons.

The communication unit 110 performs a support function to form a communication channel of the terminal 100. The communication unit 110 may be added or omitted according to a need to support the communication function of the terminal 100. When the terminal 100 does not support the communication function, the communication unit 110 may be omitted. The communication unit 110 may form a communication channel with other terminals or an external service, and may download a specific App from the other terminals or the external server. In this case, the communication unit 110 may further download an icon for activating a corresponding App. The downloaded App and icon may be stored in the memory 150, and the icon may be outputted on an icon display screen through an installation procedure. The communication unit 110 is not limited to specific a communication technology or scheme, such as, for example, various communication modules for supporting communication schemes for each generation such as $2^{nd}$ Generation (2G), $3^{rd}$ Generation (3G), $4^{th}$ Generation (4G), and $5^{th}$ Generation (5G), a communication module for supporting a communication scheme such as Time Division Multiple Access (TDMA), Code Division Multiple Access (CDMA), Wideband CDMA (WCDMA), Frequency Division Multiple Access (FDMA), Orthogonal FDMA (OFDMA), and a wired/wireless network based communication module. The communication unit 110 may be configured by a communication module capable of supporting reception of various event information displayed on the terminal 100. For example, the communication unit 110 may form at least one of a voice channel, a message channel, and a data channel with the communication service device 300 in real time, periodically, or fixedly with the other terminals or an external specific server.

The input unit 120 may generate various input signals necessary to operate the terminal 100. The input unit 120 may be provided by a specific key, such as, for example, a button key, a side key, a home key, or a touch map supporting a full touch screen. The touch map is displayed on the first display unit 140 and may generate an input signal according to user touch. The input unit may generate an input signal for selecting a specific icon from an icon display screen, an input signal requesting download of a specific App after connecting with the other terminals or the external server, and an input signal for selecting a specific icon to activate an App corresponding to the selected specific icon. The input unit 120 may generate an input signal for returning a specific icon discarded to a warehouse page to the icon display screen, and an input for reinstalling a removed icon and a corresponding App in the warehouse when an additional preset non-use period lapses. The generated input signals are transferred to the controller 160 so that the controller 160 may support a function according to the input signals.

The audio processor 130 includes a speaker SPK for outputting an audio signal of the terminal 100 and a microphone MIC for collecting an audio signal. When an App corresponding to a specific icon is activated and a corresponding App includes a function outputting an audio signal, the audio processor 130 may support an output function of a corresponding audio signal. When an icon is selected, the audio processor 130 may output a guide sound or an effect sound corresponding to the selection of the icon. Particularly, the audio processor 130 may output the guide sound or the effect sound differently, when a specific icon is selected according to a non-use history of the icon. The audio processor 130 may output an effect sound for reporting discarding to the warehouse page, or a guide sound guiding which icon is discarded to the warehouse page. The output of the guide sound or the effect sound according to selection of the icon may be omitted by user setting.

The display unit 140 provides various screen interfaces necessary to operate the terminal 100. The display unit 140 includes a touch panel 143 and a display panel 141 to support a touch function. The display unit 140 may output an icon display screen displaying at least one icon, a screen according to an App function associated with a corresponding icon when a specific icon outputted on the icon display screen is selected, and a warehouse page separately keeping and displaying icons for which a preset non-use period has elapsed. The display unit 140 may output an icon removal information screen providing information about icons for which the additional preset non-use period has elapsed, and a setting interface screen for adjusting setting information of a warehouse page.

The icon display screen is a screen to which the icon operation function is applied, according to an embodiment of the present invention. Icons of different forms may be outputted on the icon display screen according to a non-use history and based on a preset non-use period set by the user. Icons that are not used from the preset non-use period on the icon display screen may be removed automatically or based on a confirmation from the user. The removed icons may be discarded to the warehouse page automatically or based on a confirmation from the user.

The warehouse page is a page that outputs at least one icon that is not used within a designated preset non-use period. The icons outputted on the warehouse page may be outputted as icons of different forms based on an additional preset non-use period. If the additional preset non-use period lapses, a corresponding icon is removed from the warehouse page automatically or based on a confirmation from the user. An App associated with the corresponding icon may also be removed.

The memory 150 may store various Apps necessary for operating the terminal 100 or for supporting a specific terminal function. For example, the first memory 150 may support an operating system for operating the terminal 100, a communication function support program for supporting a communication function, a file playback program, and a file search program. Particularly, according to an embodiment of the present invention, the memory 150 stores an icon management program 151 and icon data 153. A warehouse region may be allocated to the memory 150 to manage icon data that is classified separately from the icon data 153 for which a preset non-use period has elapsed. The warehouse region may store the icon data for which the preset non-use period has elapsed.

The icon management program 151 may include a display adjustment routine, which adjusts a display format of an icon differently according to a number of times icons outputted on an icon display screen are used and selected. The icon management program 151 may also include a primary process adjustment routine processed when a designated preset non-use period elapses for a specific icon, i.e., without selection of the specific icon. The icon management program 151 may further include a secondary process adjustment routine processed when an additionally designated preset non-use period elapses for an icon discarded to a warehouse.

The display adjustment routine may include a sub-routine for confirming a preset non-use period and an additional preset non-use period. The display adjustment routine may also include a sub-routine for confirming use histories of icons based on a corresponding period. The display adjustment routine may further include a sub-routine for displaying images of icons by non-use histories while gradually reducing the size of the images or gradually increasing transparency according to the confirmed result. The display adjustment routine may adjust display formats of icons arranged at the icon display screen and the warehouse page.

The primary process adjustment routine may include a sub-routine for confirming whether a preset non-use period elapses for a specific icon. The primary process adjustment routine may also include a sub-routine for automatically discarding the specific icon to the warehouse page when the preset non-use period elapses for the specific icon. The primary process adjustment routine may further include a routine for producing an alarm when discarding the specific icon to the warehouse page. The sub-routine for producing the alarm discards a corresponding icon to the warehouse page and classifies a classification form stored in the memory 150.

The secondary process adjustment routine may include a sub-routine for confirming whether an additional preset non-use period has elapsed for an icon discarded to a warehouse page, and a sub-routine of removing the specific icon arranged at a warehouse or producing an alarm confirming confirmation when the additional preset non-use period elapses for the specific icon. The sub-routine of producing the alarm may remove a corresponding icon according to user input, and may remove icon data 153 stored in the memory 150 upon removal of the corresponding icon. The secondary process adjustment routine may further include a sub-routine for collecting information such as, for example, removed Meta data of icons, and a sub-routine for performing connection to a corresponding server, App downloading, and App installation to reinstall the removed icon, according to an input signal for reinstalling the removed icon when the input signal is generated.

The icon data 153 may include program data for supporting a specific App, and an icon of an image form icon outputted on at least one of an icon display screen and a warehouse page, so that a user can select a corresponding App function. If an icon display screen call input signal is generated, an icon included in the icon data may be outputted on the display unit 140, according to a previously defined scheme. If the specific icon is selected, program data may loaded to the controller 160 to perform processing for supporting an App function associated with a corresponding icon. An icon from among the icon data 153 is resized and a transparency thereof is adjusted. The resized or adjusted icon may be outputted on the icon display screen.

The controller 160 performs supply and distribution of power, and transfer and processing of signals necessary to operate the terminal 100. The controller 160 may control signals to support an icon operation, according to an embodiment of the present invention. The controller 160 may include constituent elements as shown in FIG. 2.

Figure 2:
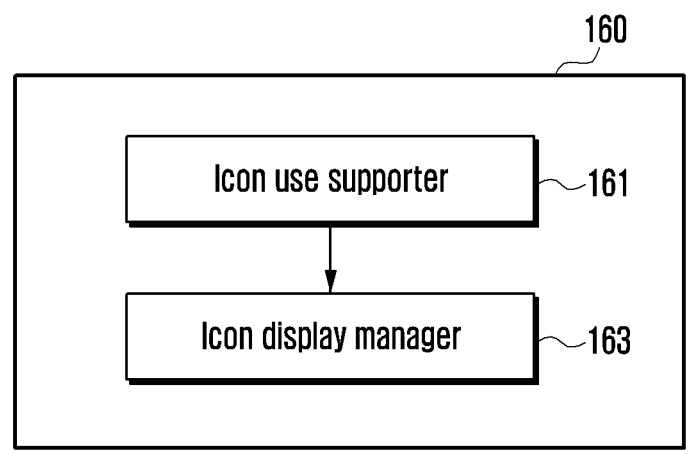
FIG. 2 is a block diagram illustrating a configuration of a controller of FIG. 1, according to an embodiment of the present invention.

FIG. 2 is a block diagram illustrating a configuration of a controller of FIG. 1, according to an embodiment of the present invention.

Referring to FIG. 2, the controller 160 includes an icon use supporter 161 and an icon display manager 163.

The icon use supporter 161 supports use of an icon to operate a function of a terminal 100, which the terminal 100 may provide. If a specific icon is selected from the icon display screen or a warehouse page for activation, the icon use supporter 161 may support processing for performing an App function corresponding to the selected specific icon. For example, if a chatting function icon is selected, the icon use supporter 161 calls and activates a chatting program associated with the chatting function icon, and outputs a screen interface according to activation of chatting on a screen. The icon use supporter 161 may transmit a created chatting message to another terminal, and output a chatting message received from another terminal to a screen interface. In addition, the icon use supporter 161 may remove a specific icon and an App associated with a corresponding icon from the terminal 100.

The icon display manager 163 adjusts display formats of icons associated with an icon operation, and supports location motion and removal of the icons. When schedule information or an input signal for calling the icon display screen is generated during performance of a function of the terminal 100, the icon display manager 163 may output an icon display screen configured by previously registered various icons for supporting a function of the terminal on the display unit 140. The icon display manager 163 may confirm a use history based on a designated preset non-use period with respect to respective icons, and express display formats of icons differently from an original display format, according to a non-use history. The display formats of the icons are described in greater detail below with reference to the accompanying drawings.

The icon display manager 163 may discard icons to the warehouse page when a preset non-use period elapses for the icons, and may display the discarded icons. The icon display manager 163 may separately group and manage icon data 153 of the icons discarded to the warehouse page. The icon display manager 163 may control display formats of the icons discarded to the warehouse page to an original display format based on an additional preset non-use period. The icon display manager 163 may automatically remove icons when the additional preset non-use period elapses for the icons or may perform a confirmation procedure for removal. The icon display manager 163 may install an App received from a service or another terminal to support a specific App function, and output an icon for executing a corresponding App function on the display unit 140 after completion of the installation. The icon display manager 163 may provide a list of removed icons according to a non-use setting, and reinstall an App associated with an icon selected from a corresponding list. The list of removed icons provided from the icon display manager 163 has a predetermined number of icons. When an item is added, the icon display manager 163 may preferentially remove the oldest item and add a new item to maintain a predetermined number of icons in the list.

As described above, the terminal 100 has a display format based on a specific rule according to a non-use history and based a setting period of a user upon displaying icons, so that the user may intuitively recognize non-use states of specific icons. The terminal 100 performs process recommendation or automatic processing of icons, which the user does not use in managing an icon, to easily manage a non-use icon and a corresponding App. When there is a plurality of icons to be outputted on an icon display screen in an initial booting procedure, the terminal 100 confirms, renders, and displays a plurality of icons, so that an overhead of the terminal is increased if there is a plurality of non-use Apps. When a predetermined condition of the terminal 100 is possible, the terminal 100 removes an icon and an App associated with the icon automatically, according to recommendation or confirmation, thereby reducing the overhead of the terminal 100. The terminal 100 restores icons removed through one touch selection to reinstall a corresponding App.

Figure 3:
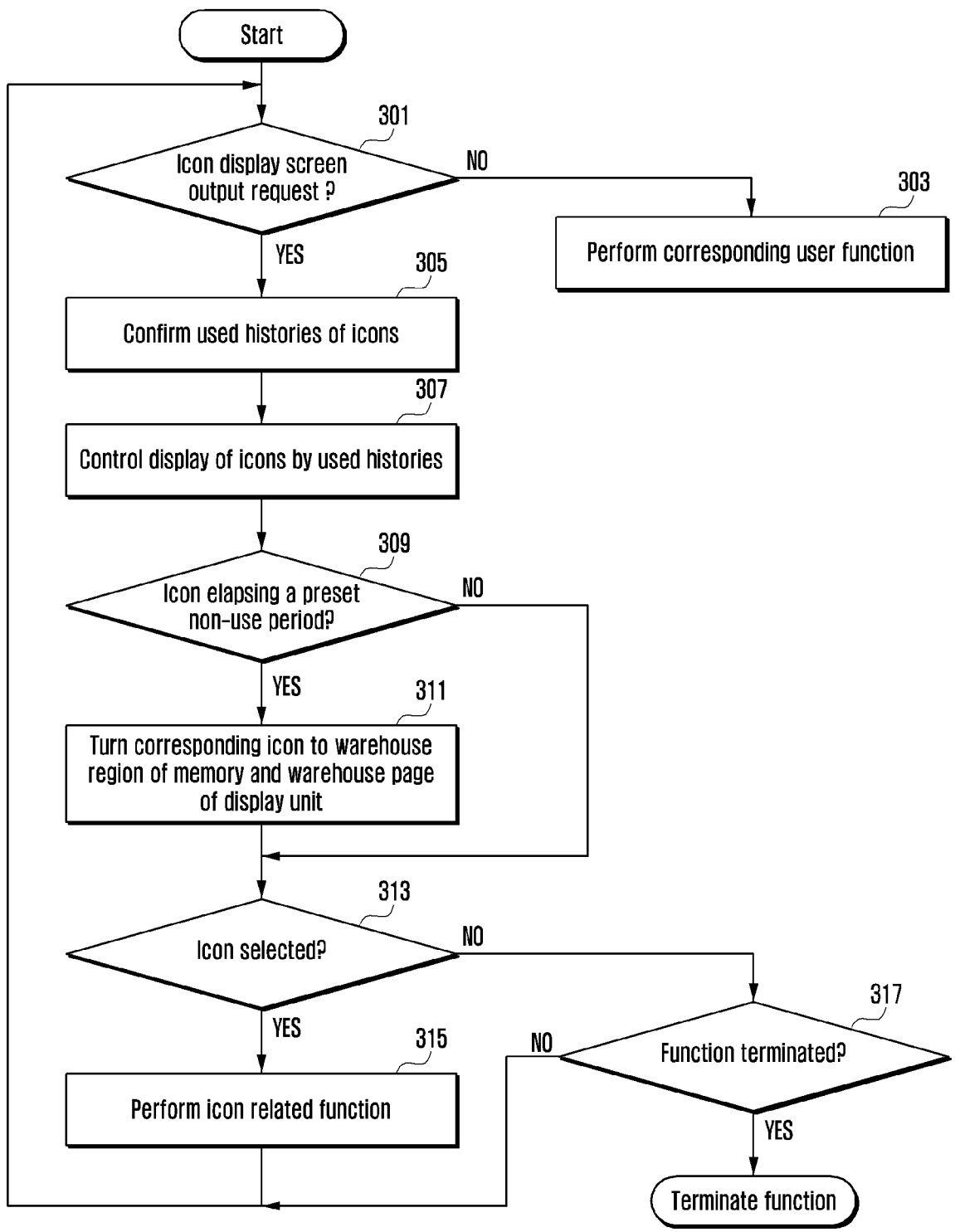
FIG. 3 is a flowchart illustrating an icon operation method in a terminal, according to an embodiment of the present invention.

FIG. 3 is a flowchart illustrating an icon operation method in a terminal supporting an icon operation, according to an embodiment of the present invention.

Referring to FIG. 3, according to an embodiment of the present invention, the controller 160 determines whether an icon display screen output request is generated, in step 301. When the generated input is not for the icon display screen output request, the controller 160 performs a user function according to a corresponding input signal, in step 303. For example, the controller 160 may provide information for a call connection function, a file playback function, a function of connecting with a server such as a web, a clock function, and a date function. The icon display screen output request may be changed according to a provision of a function of the terminal 100. For example, the icon display screen output request may be an input signal for activating a menu key of the terminal 100. The icon display screen output request may be an input signal for releasing a lock screen of the terminal 100. The icon display screen output request may be an input signal for releasing a sleep mode of the terminal 100. As described above, an input signal corresponding to the icon display screen output request may be configured differently according to a design scheme of the terminal 100.

When an input signal for the icon display screen output request is generated at step 310, the controller 160 confirms use histories of icons, in step 305. Specifically, the controller 160 may confirm types of icons to be outputted on an icon display screen, and may confirm use histories of corresponding icons. The controller 160 may confirm Meta data of respective icons, and the Meta data may include final selection or activation time point information upon selection of a specific icon.

When the use histories of icons are confirmed, the controller 160 controls display of icons by use histories, in step 307. The controller 160 determines whether a preset non-use period elapses for icons, in step 309. When a preset non-use period has elapsed for an icon, the controller 160 discards the corresponding icon to a warehouse region of the memory 150 and a warehouse page of the display unit 140, in step 311. When there is a preset non-use period has not elapsed for an icon, the controller 160 skips step 311 and proceeds to step 313.

The controller 160 processes icons displayed on the warehouse page during an additional preset non-use period, in step 311. Specifically, the controller 160 may display icons displayed on the warehouse page in a form other than an originally displayed form, according to an elapsed time and based on the additional preset non-use period. The controller 160 may automatically remove the icons for which additionally preset non-use period has elapsed or may recommend removal of the icons. The removed icons may be managed through a list of separately removed icons composed of Meta data of corresponding icons.

The controller 160 determines whether an input signal for selecting an icon is generated, in step 313. If the input signal for selecting an icon is generated, the controller 160 performs an icon related function, in step 315.

Conversely, when the input signal for selecting an icon is not generated at step 313, the controller 160 determines whether an input signal for terminating a function is generated, in step 317. When the input signal for terminating a function is not generated, the process returns to step 301 and repeats the forgoing procedures. When the input signal for terminating a function is generated, the function terminates.

As described above, the icon operation method, according to an embodiment of the present invention, may perform an intuitive operation of an icon according to an operation of the terminal. The foregoing embodiment of the present invention illustrates that icons for which a preset non-use period has elapsed are discarded to a warehouse region and a warehouse page by way of example, but the embodiments of the present invention are not limited thereto. Specifically, according to user setting or intention of the user, an application function of an additional preset non-use period is not performed, but icons for which the preset non-use period has elapsed may be directly removed without being discarded to a warehouse.

The foregoing embodiment of the present invention illustrates the terminal supporting an icon operation. Hereinafter, various screen interfaces for supporting the foregoing terminal and operation method are described in detail with reference to the accompanying drawings.

Figure 4:
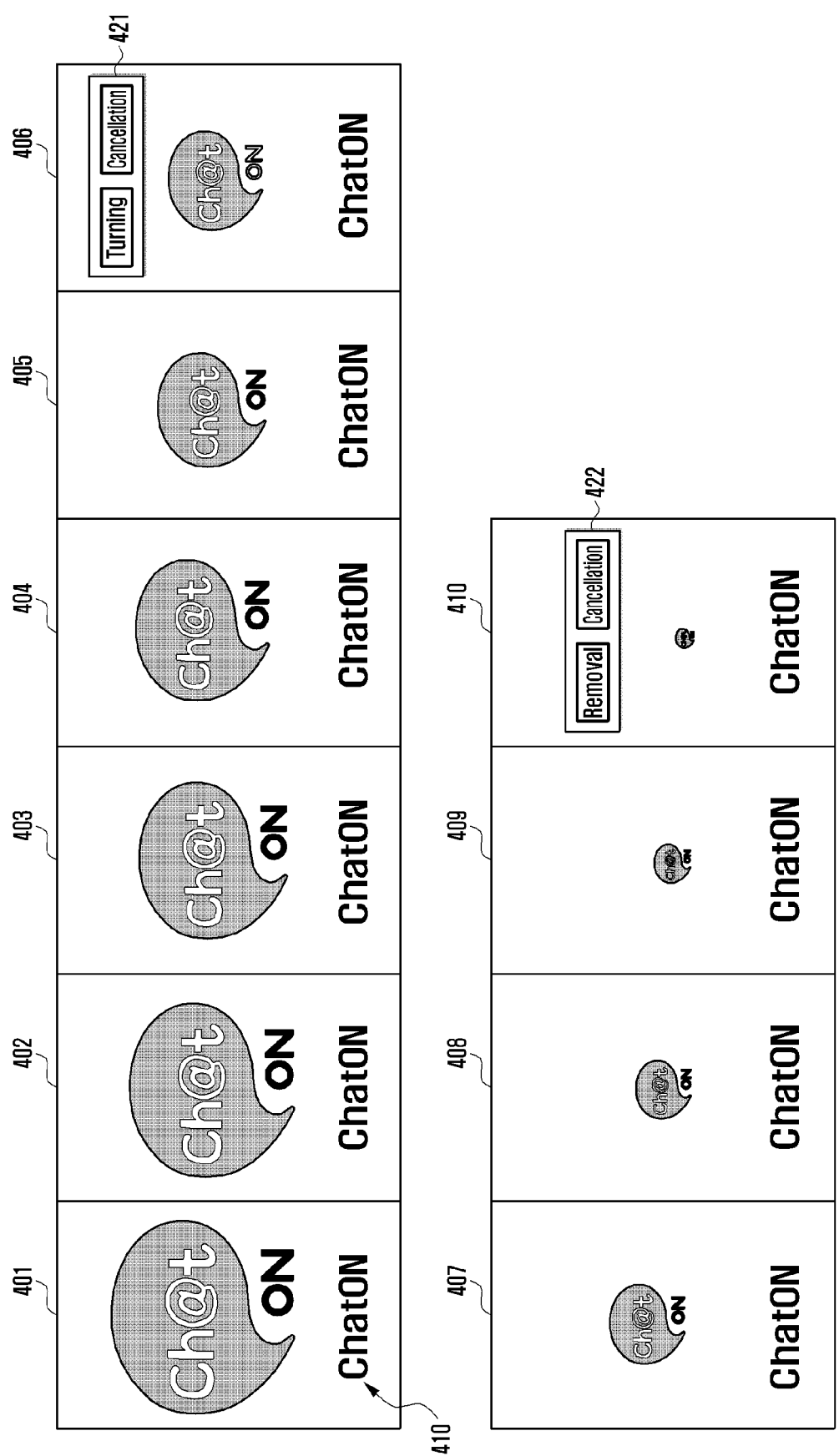
FIG. 4 is a diagram illustrating transformation of a display pattern of an icon, according to an embodiment of the present invention.

FIGS. 4 to 10 are diagrams illustrating a screen interface applied to the terminal supporting an icon operation and the operation method thereof, according to embodiments of the present invention. Particularly, FIG. 4 is a diagram illustrating transformation of a display format of an icon, according to an embodiment of the present invention.

The terminal 100 may output various icons, and a chatting related icon may be outputted on an icon display screen, by way of example, as shown in FIG. 4. A first chatting related icon is displayed with a maximum size as icon 401, and description information 410 for describing the icon 401 is outputted in a region adjacent to a region to which the icon 401 is outputted, for example, a bottom end of the icon 401. The description information 410 may be displayed in the form of a text, and may be displayed in a region adjacent to a region in which the icon is arranged or a region having at least a part overlapping with the region in which the icon is arranged.

When the user designates a preset non-use period, a display format of the icon 401 may vary according to time lapse. Specifically, the size of the icon 401 may be gradually reduced in an order of an icon 402, an icon 403, an icon 404, an icon 405, and an icon 406. While the size of the icon is gradually reduced, the size of the description information 410 is maintained so that the user may easily confirm which function a corresponding icon supports. An icon 406 may corresponding to a final day during a period registered by the user as a preset non-use period. Accordingly, the terminal 100 may output a first pop-up window 421 determining whether to discard an icon 406 from an icon display screen to a warehouse page, together with the icon 406. If an input signal indicating discarding of the icon 406 to a warehouse page is generated on the first pop-up window 421, the terminal 100 may remove the corresponding icon 406 from the icon display screen, and discard the corresponding icon 406 to the warehouse page. The terminal 100 may automatically discard icons to the warehouse page for which the preset non-use period has elapsed without separate output of the first pop-up window 421, or automatically remove the icons according to a setting.

A form of the icons discarded to the warehouse page may vary gradually based on an additional preset non-use period designated by the user. The size of the icon reduces gradually according to a time lapse based on the additional preset non-use period in the order of an icon 407, an icon 408, an icon 409, and an icon 410. During this procedure, the size of the description information is maintained to support icon function recognition. The icon 410 may be the form of a final day of the additional preset non-use period or an icon for which the additional preset non-use period has elapsed. Accordingly, upon output of the icon 410, the terminal 100 may confirm whether to remove the icon 410 by outputting a pop-up window 422. The user may instruct removal of the corresponding icon by clicking a removal button. The icon 410 may also be removed without a separate output of the second pop-up window 422. Upon removal of the icon, an installed program associated with a corresponding icon is removed together with the icon. The terminal 100 may collect Meta data of the removed icons to create a list of removed icons for reinstallation.

The foregoing embodiment varies the size of an icon according to period lapse by way of example, but embodiments of the present invention are not limited thereto. Specifically, the terminal 100 may vary transparency of an icon according to period lapse based on the preset non-use period. That is, the terminal 100 may display the icon with a gradual increase in transparency according to the period lapse.

Figure 5:
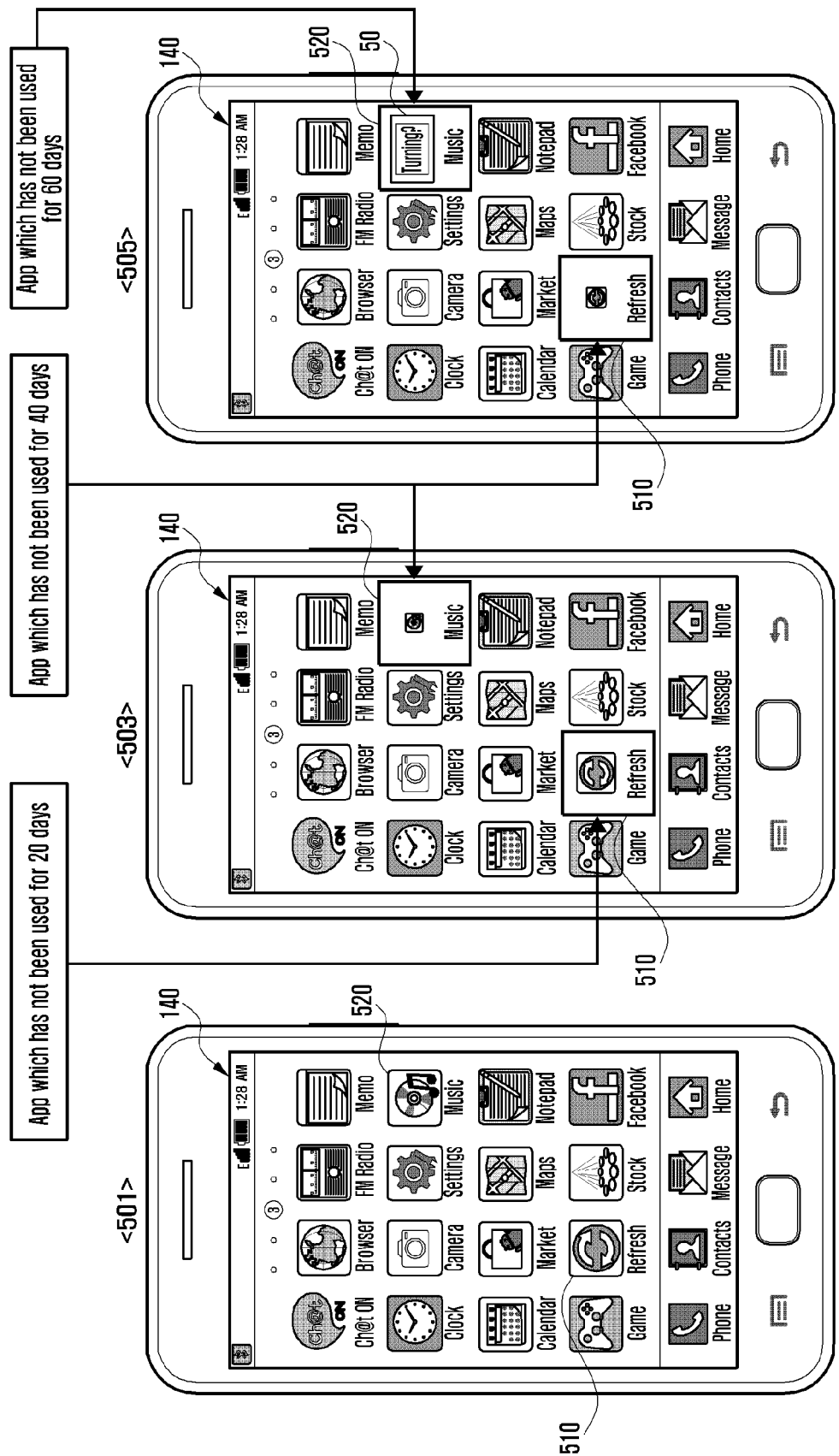
FIG. 5 is a diagram illustrating an icon display screen applied by transforming the display pattern of the icon shown FIG. 4, according to an embodiment of the present invention.

FIG. 5 illustrates a screen interface for describing variation in the size of the icon shown in FIG. 4, according to an embodiment of the present invention.

Referring to FIG. 5, if an input signal for requesting icon display is generated, the terminal 100 may output an icon display screen including at least one icon on the display unit 140 as illustrated in a screen 501. The user may apply an icon operation function to icons outputted on the icon display screen. The terminal 100 may provide a screen interface capable of designating the preset non-use period. When the user designates the preset non-use period as 60 days, the terminal 100 may a display format differently, according to period lapse of icons which are not used when a time lapses.

For example, in a screen 503, the terminal 100 can display a first icon 510, which has not been used for 20 days, smaller than a first displayed form by a predetermined size. The terminal 100 may display a second icon 520, which is not used for 40 days, smaller than a previously displayed form.

If 20 days further elapse, the terminal 100 may output a form of the first icon 510 that is smaller than a form outputted on the screen 503, as illustrated in a screen 505. The terminal 100 may not display the icon 520 on the screen 505. However, description information about the second icon 520 is displayed at the same size so that the user may recognize the second icon 520. In addition, as described above, the terminal may output a pop-up window 50, which is capable of selecting warehouse discarding or removal of the second icon 520, in a region where the second icon 520 is outputted or a region adjacent thereto.

Figure 6:
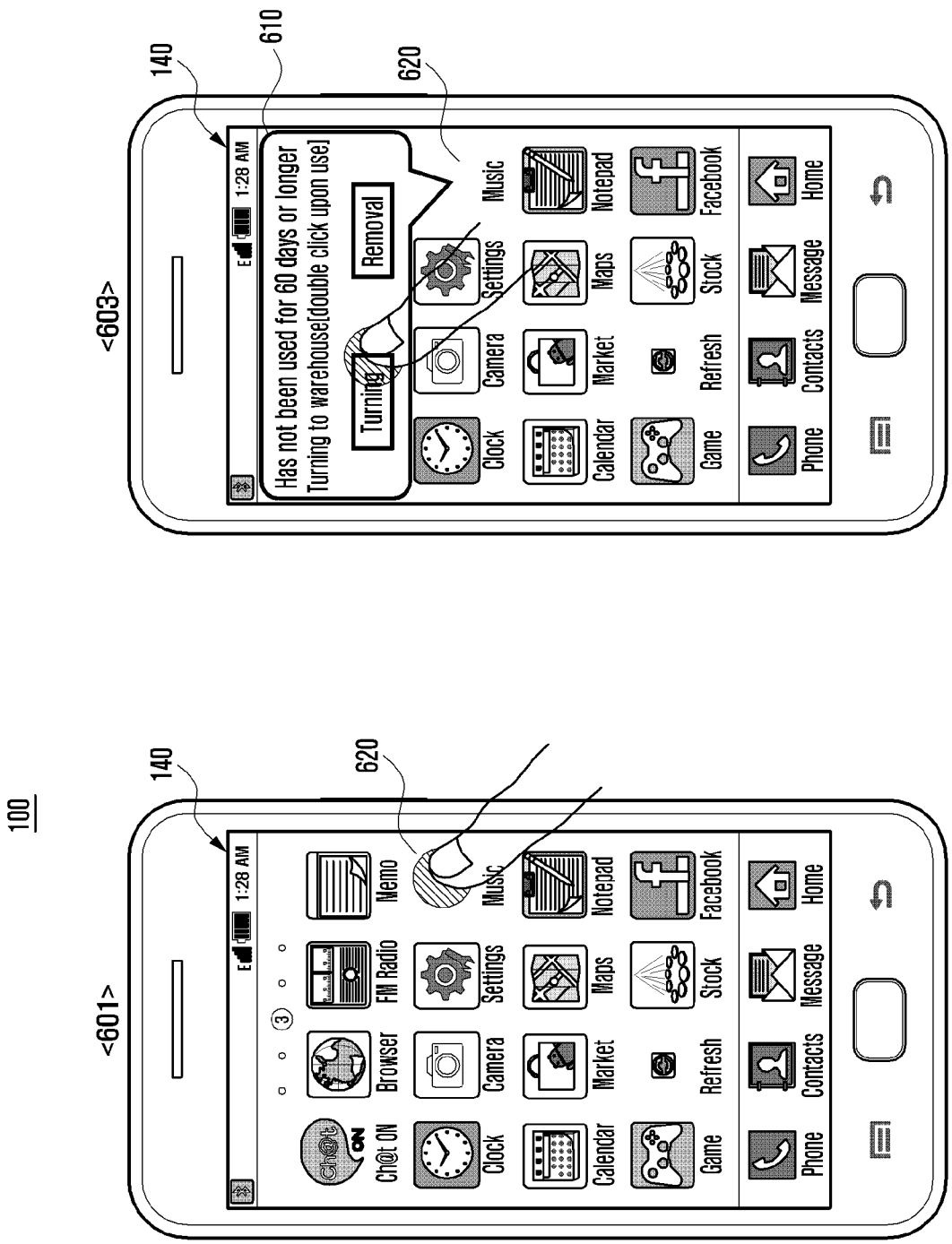
FIG. 6 is a diagram illustrating discarding an icon to a warehouse page, according to an embodiment of the present invention.

FIG. 6 is a diagram illustrating discarding an icon to a warehouse page, according to an embodiment of the present invention.

Referring to FIG. 6, a terminal 100 may remove an image of an icon for which a preset non-use period, designated by the user, has elapsed. Specifically, as illustrated in a screen 601, description information of a period lapse icon 620 may be displayed and its size maintained, while an image of the icon is removed. The user may touch a region in which an image of the icon is removed so that a displayed period lapse icon 620 is outputted. To this end, a first allocated touch region of a period lapse icon 620 may be maintained as a valid region even if the image of the icon is removed.

The terminal 100 may output a first message window 610 confirming whether to discard the period lapsed icon 620 to a warehouse on the display unit 140, as illustrated in a screen 603. The first message window 610 may display information associated with a corresponding period lapse icon 620. For example, the first message window 610 may display a guide with respect to a non-use history for the number of actual non-use lapse days, for example, 60 days. If the period lapse icon 620 has not been used for 65 days, the first message window 610 may display a guide for describing that the period lapse icon 620 has not been used for 65 days. The first message window 610 may be displayed on only a region of the period lapse icon 620, or may be displayed in the form of a balloon, as shown in FIG. 6. When the user selects discarding from the first message window 610, a corresponding icon may be discarded to a warehouse page. Simultaneously, the terminal 100 may arrange a corresponding icon at a warehouse region of the memory 150.

A confirmation function of discarding of an icon to a warehouse may be omitted upon setting automatic discarding for the icon.

Figure 7:
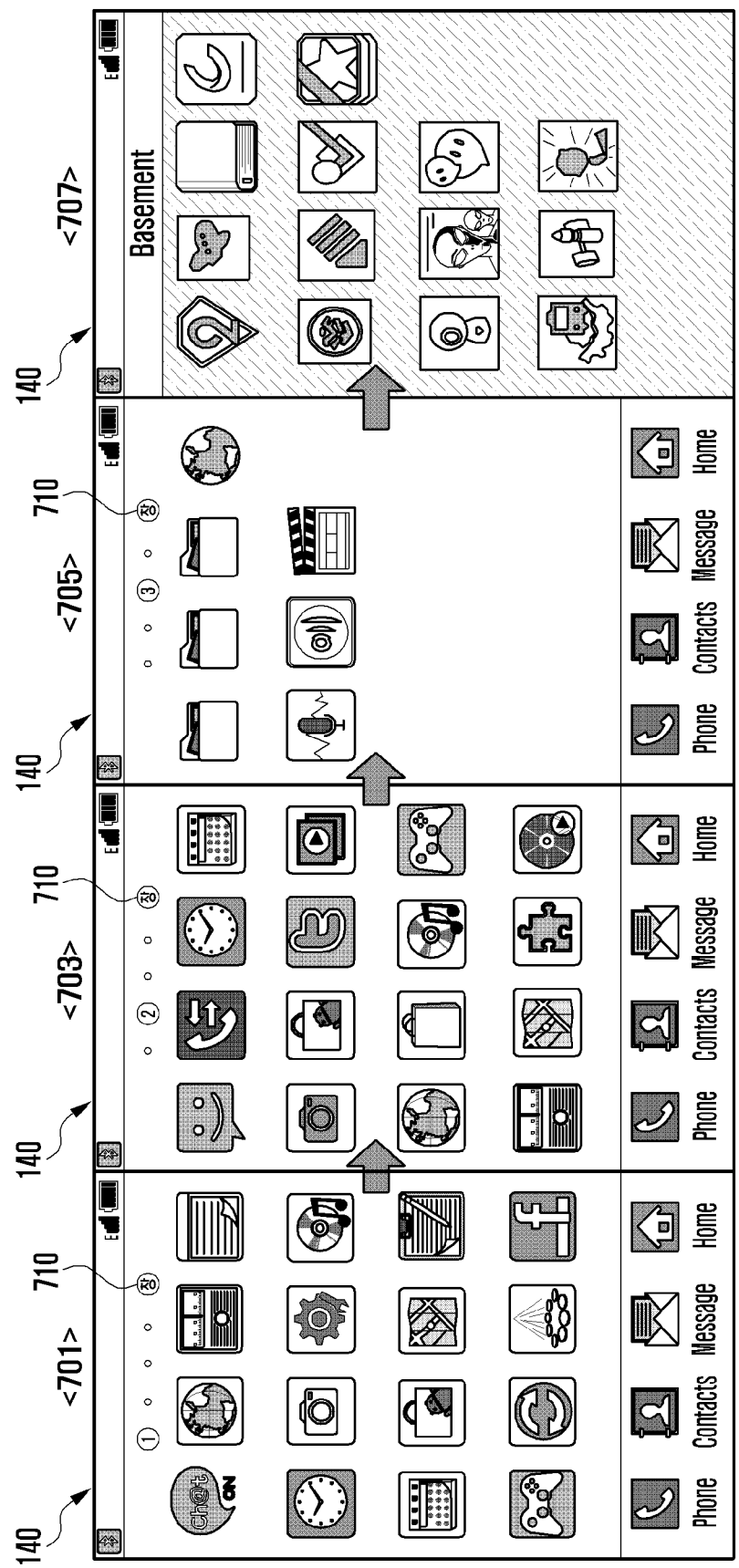
FIG. 7 is a diagram illustrating searching a warehouse page, according to an embodiment of the present invention.
Figure 8:
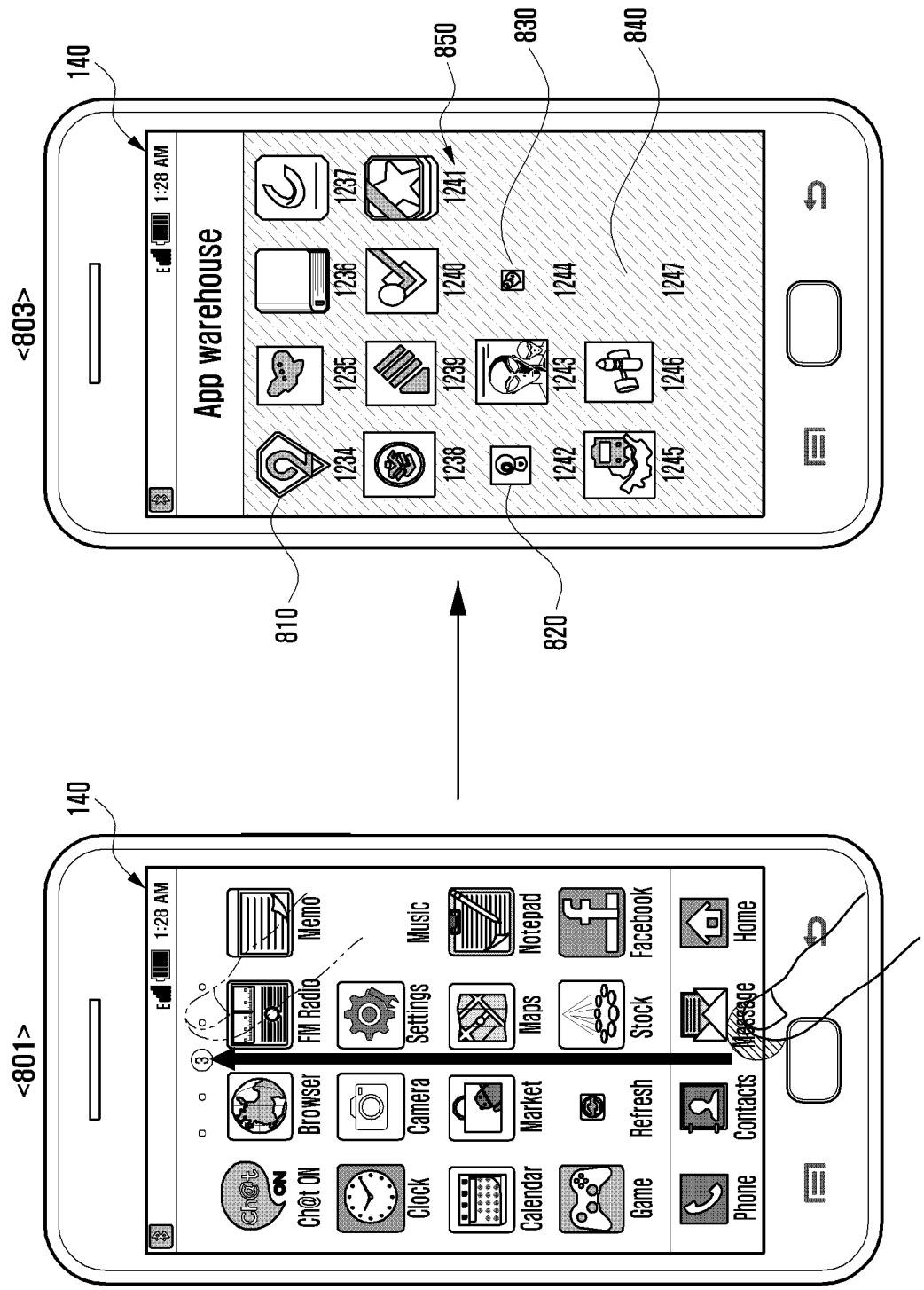
FIG. 8 is a diagram illustrating discarding to a warehouse page and operating the warehouse page, according to an embodiment of the present invention.

FIGS. 7 and 8 are diagrams illustrating a warehouse page among an icon operation function, according to an embodiment of the present invention.

Referring to FIG. 7, the terminal 100 may have various pages in which various icons are arranged as illustrated in a screen 701, a screen 703, and a screen 705. The user may change the respective pages of an icon display screen by generating a flick event or a drag even on the screen.

If an input signal for additional discarding or an input signal for outputting a warehouse page is generated in a state that a final page of the icon display screen is outputted on the display unit 140, the terminal 100 may output the warehouse page on the display unit 140, as illustrated as a screen 707. As shown, when continuously adjusting page turning in one direction, a warehouse page is finally displayed, but the present invention is not limited thereto. Specifically, when an input signal for turning the page in a left side on a screen 701 is received, the warehouse page may be outputted on the display unit 140. When a separately provided pointer 710 is selected, the terminal 100 may directly output the warehouse page on the display unit 140.

A warehouse page shown in the screen 707 has a different background color so that the user may intuitively recognize a corresponding page as the warehouse page. The terminal 100 may display a title indicating a warehouse page, for example, "Basement" at one side of the page so that the user may recognize the warehouse page.

Referring to FIG. 8, the user may generate a predetermined touch/gesture to shortcut the warehouse page on a display unit 140 on which an icon display screen displaying icons is outputted, as illustrated in a screen 801. For example, the user may operate a touch gesture crossing vertically.

If a preset touch event, for example, a touch event vertically crossing the touch panel 143 displaying an icon display screen on the display unit 140, the terminal 100 may output a warehouse page on the display unit 140, as illustrated in a screen 803. Since the warehouse page has a different background color, the user may intuitively recognize a corresponding page as the warehouse page. The terminal 100 may recognize a touch event that proceeds from a region allocated for displaying icons to a menu region at a bottom end of the page on which schedule menu icons, for example, a call icon, a phone-book icon, a message icon, and a home icon are displayed, as a warehouse page shortcut input.

The terminal 100 may vary display of an icon according to a non-use period with respect to respective icons in a warehouse page on the screen 803. For example, when the user designates an additional preset non-use period to display icons of a warehouse, the terminal 100 may display an icon image in which the size of the icon image varies according to an additional non-use period. A third icon 810 may be an icon that was recently discarded to the warehouse page. A fourth icon 820 may be an icon that was discarded to the warehouse page 10 days ago. A fifth icon 830 may be an icon that was discarded to the warehouse page 20 days ago. A sixth icon 840 may be an icon that was discarded to the warehouse page 30 days ago. It is assumed that an additional preset non-use period is designated as 30 days.

Accordingly, the sixth icon 840 may display only description information 850 "1247" without separate output of an icon image. A text allocated to a previous icon is removed from the description information 850, a specific character or specific numbers are allocated to icons discarded to the warehouse page and are displayed on the description information 850. A text allocated to the previously icon may be further displayed on the description information 850.

Figure 9:
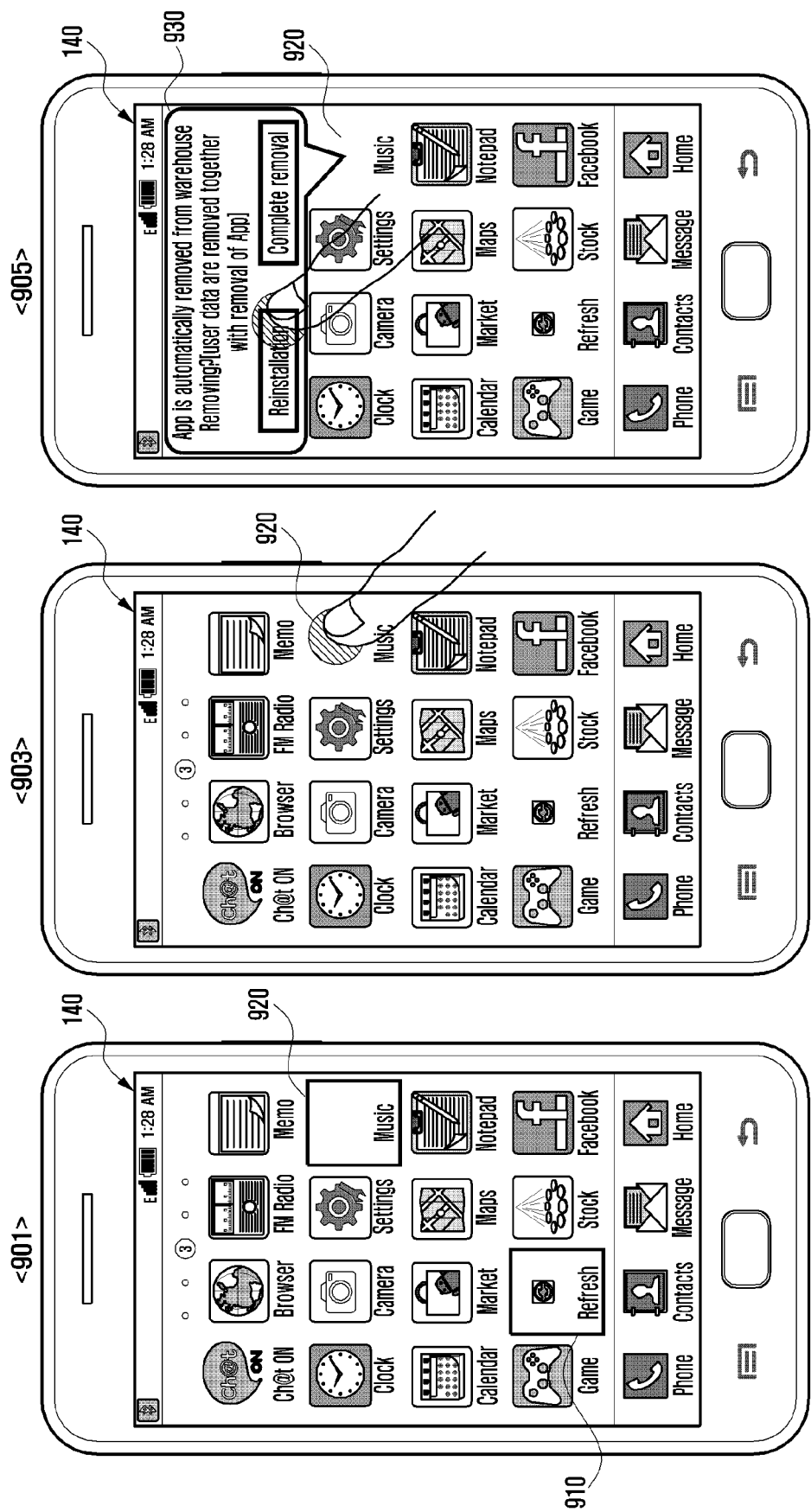
FIG. 9 is a diagram illustrating a control operation with respect to removal or reinstallation of the icon, according to an embodiment of the present invention.

FIG. 9 is a diagram illustrating a function associated with removal of an icon among an icon operation function, according to an embodiment of the present invention.

Referring to FIG. 9, the warehouse page may be provided to the display unit 140 as a display screen displaying a plurality of icons as illustrated in a screen 901. A background screen of the warehouse page may be displayed differently from another icon display. The warehouse page may vary display formats of icons according to an additional preset non-use period designated by the user. Specifically, a display format of the warehouse page may be displayed smaller than an originally displayed form, or may be displayed in the form from which an icon image is removed according to lapse of the additional preset non-use period like a seventh icon 910 or an eighth icon 920. The user may selection reinstallation or complete removal of the eighth icon 920 from which the icon image is removed. If an input signal for selecting the eighth icon 920 is generated, the terminal 100 may output a second message window 930 confirming reinstallation or complete removal of the eighth icon 920 at one side of the display unit 140, as illustrated in a screen 905. The second message window 930 may include information associated with a state of the eighth icon 920.

The terminal 100 may automatically remove a corresponding App with respect to an icon for which the additional preset non-use period has elapsed, and may maintain Meta data (application name, downloaded Appstore link, user data) of the App during a removal procedure. When the user requests installation after removal, the Meta data may be used to restore a previous environment. Accordingly, the terminal 100 may perform reinstallation and restoration by one click.

Complete removal in the second message window 930 is a function which completely removes the Meta data after removal of the App. In the foregoing scheme, the terminal 100 does not request to separately manage a removal App list.

The foregoing embodiment has illustrated that the screen 905 is the warehouse page, but embodiments of the present invention are not limited thereto. Specifically, the screen 905 may be an icon display screen. The terminal 100 may maintain a history with respect to an automatically removed App when a preset non-use period elapses in the image form from which an icon is removed, as shown in an icon display screen.

Figure 10:
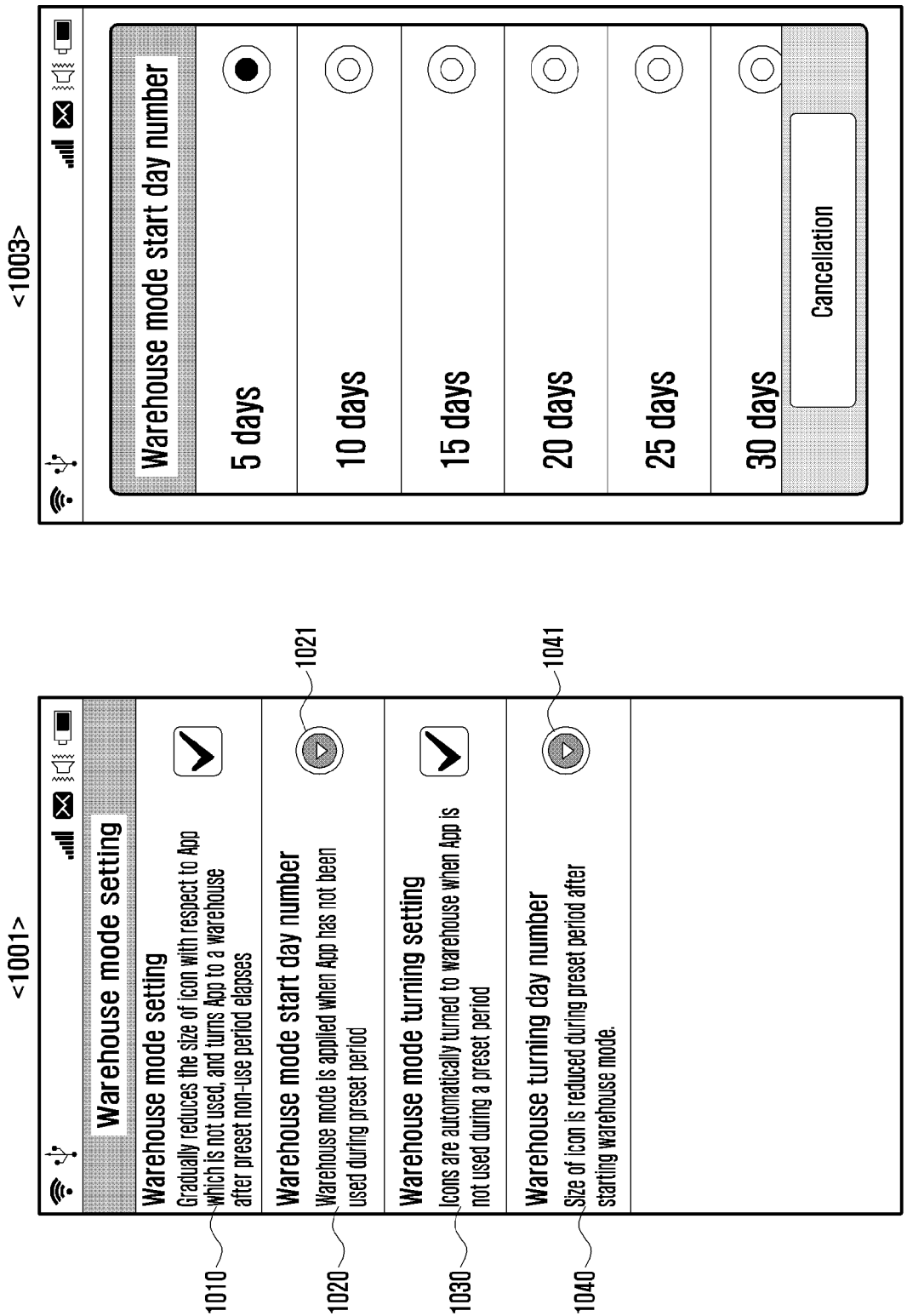
FIG. 10 is a diagram illustrating a screen interface for setting a warehouse mode, according to an embodiment of the present invention.

FIG. 10 is a diagram illustrating a preset page for a warehouse operation in an icon operation function, according to an embodiment of the present invention.

Referring to FIG. 10, the display unit 140 may output a screen interface associated with warehouse mode setting as illustrated in a screen 1001. A warehouse mode setting screen may include a warehouse mode setting region 1010, a warehouse mode start day number region 1020, a warehouse mode discarding setting region 1030, and a warehouse discarding day number region 1040.

The warehouse mode setting region 1010 is a region that sets a function for gradually reducing the size of an icon with respect to an App, which is not used, and discarding the App to a warehouse after a preset non-use period elapses. When a warehouse mode is set through the warehouse mode setting region 1010, output of a message window may be supported for an App for which the preset non-use period has elapsed. The warehouse mode start day number region 1020 may be a region to which a warehouse mode is applied, when the App has not been used during a preset period.

The warehouse mode start day number region 1020 may provide a first period setting link 1021 to set a period. When the user selects the first period setting link 1021, a screen 1003 may be outputted. The user may then designate a preset non-use period through the screen 1003. The warehouse mode start day number indicates a start time point for an icon variation algorithm, when an App is not used during the preset non-use period.

The warehouse mode discarding setting region 1030 is a region for setting that icons are automatically discarded to a warehouse when the App is not used during a preset period. If a corresponding function is set through the warehouse mode discarding setting region 1030, icons for which the preset non-use period has elapsed may be automatically sent to the warehouse. When the automatic discarding function provided from the warehouse mode discarding setting region 1030 is not set, a message window may be outputted to discard from the warehouse.

The warehouse discarding day number region 1040 is a function that reduces the size of the icon during a preset period after starting a warehouse mode. The warehouse discarding day number refers to a total period when variation in the icon operates during a period set by the user after starting the warehouse mode. The warehouse discarding day number region 1040 designates days for gradually transforming a display format of an icon discarded to the warehouse page, as the additional preset non-use period. The warehouse discarding day number region 1040 may provide a second period setting link 1041. When the user selects the second period setting link 1041, the screen may be converted to a screen capable of designating the additional preset non-use period, which is similar to the screen 1003.

As described above, a screen interface supporting an icon operation, according to an embodiment of the present invention, varies an icon based on a preset non-use period or an additional preset non-use period, designated by the user, so that the user may intuitively confirm icons that are not used. Embodiments of the present invention discard icons, which are not used, or an App associated with a corresponding icon, to a warehouse or removes the icons or the App so that the user can easily operate the icons.

An icon whose size becomes smaller may be restored to an original size according to selection and activation of the user, or may be gradually restored to the original size according to selection and activation degrees. When an icon in which an icon image is removed from the icon display screen is discarded to a warehouse page, the icon may have original icon size and form and when outputted at a warehouse page.

The foregoing embodiments of the present invention designate a preset non-use period with respect to all icons, but embodiments of the present invention are not limited thereto. Specifically, the icon operation function of the present invention may designate preset non-use periods per icon, or may designate a different additional preset non-use period. The icon operation function of embodiments of the present invention may designate icons classified by predetermined groups differently, or preset non-use periods or additional preset non-use periods by icons arranged by predetermined pages.

The foregoing embodiments of the present invention illustrate a function of changing a size of an icon in proportion to a non-use period. However, as described above, the icon operation function of embodiments of the present invention may vary the transparency or turbidity of the icon, or may vary the transparency or turbidity of the icon together with the size. Upon variation of the turbidity, an image of the icon is gradually more dimly displayed in proportion the non-use period, and is finally displayed to have turbidity that the user may not recognize. Specifically, the icon operation function of an embodiment of the present invention may be displayed such that at least one of the size, transparency, and turbidity displayed on an icon display screen varies. Upon variation of the size, the size of the icon becomes gradually reduced according to a lapse of the non-use period so that the size finally disappears. When transparency of the icon varies by levels as time goes by, a corresponding icon becomes gradually more dim so that the icon eventually disappears.

A variation time point of the display format of the icon is set to once per day at a specific time, or a user may set the variation time point as a separate option setting. When the icon is discarded to the warehouse page, entering a warehouse of a specific icon may be reported to the user through vibration and a specific sound. When there is a plurality of warehouse pages, the plurality of warehouse pages may be sequentially arranged after an icon display screen. A corresponding warehouse page may be hidden, according to application of a page hide function, by setting an option of the user. When the warehouse page is hidden by applying the page hide function, a separate menu item or a hot key for calling the hidden warehouse page may be provided.

The foregoing embodiments of the present invention have illustrated that one warehouse is provided, by way of example, but the icon operation function of embodiments of the present invention may provide a plurality of warehouse pages. The plurality of warehouse pages may be categorized by icon use purposes or icon types. Specifically, the terminal 100 may generate six warehouses having different characteristics through an option, upon support of the warehouse function. For example, the terminal 100 may generate a warehouse that is classified by periods, types, or as designated by the user. When the terminal 100 generates the warehouse classified by periods, the terminal 100 may generate a dedicated non-use App warehouse for 1 month or longer, or a dedicated non-use App warehouse for 3 months or longer. When the terminal 100 generates the warehouse classified by types, the terminal 100 generates a classified warehouse based on Meta data of an App such as, for example, a game warehouse or a utility warehouse. When the terminal 100 generates a warehouse designated by the user, the terminal 100 generates a warehouse according to classification (baby warehouse, secret warehouse, adult App warehouse) by a specific purpose defined by the user.

The foregoing embodiments of the present invention have illustrated a function of discarding an icon during a preset non-use period, but the embodiments of the present invention are not limited thereto. Specifically, the user may move an icon outputted on the icon display screen to the warehouse page. When a previously defined input signal pressing a specific icon for long period is generated, the terminal 100 may output a pop-up window or a message window inquiring whether to move the corresponding specific icon to the warehouse page. A list with respect to a plurality of warehouses is outputted so that the user may move a corresponding icon to a desired warehouse.

The terminal described above may further include various additional modules, according to provision forms thereof. Specifically, the terminals may further include elements that are not described such as, for example, a near field communication module for near field communication, an Internet communication module communicating with an interface and an Internet network for data transceiving in a wired or wireless communication scheme to perform an Internet function, and a digital broadcasting module for performing reception and playback functions of digital broadcasting. Since the constituent elements can be variously changed according to a convergence trend of a digital device, no elements can be listed. However, the devices may include constituent elements equivalent to the foregoing constituent elements. In the terminals of the present invention, specific constituent elements may be omitted from the foregoing constituent elements or by other constituent elements according to the provision form.

The terminal, according to an embodiment of the present invention, may include various information and communication devices such as, for example, a Portable Multimedia Player (PMP), a digital broadcasting player, a Personal Digital Assistant (PDA), a music player (e.g., MP3 player), a portable game terminal, a smart Phone, a notebook computer, and a hand-held PC, as well as various mobile communication terminals operating based on communication protocols corresponding to various communication systems.

As described above, according to a terminal for supporting an icon operation and an operation method thereof of the present invention, the present invention may intuitively provide icons that are not used and a scale with respect to a non-use period to the user.

Further, embodiments of the present invention may confirm only variation of an icon through a main page without entering a separate menu to intuitively recognize presence of non-use of a corresponding icon and a non-use period.

Embodiments of the present invention may keep icons that are not used during a predetermined period based on a non-use setting to simply and clearly configure an icon display environment, which the user may search, and can rapidly and suitably process icons which are not used using a separately prepared warehouse.

In addition, embodiments of the present invention may display icons which are not used in the warehouse, and automatically remove icons that are not used and Apps associated with corresponding icons, according to an additional non-use setting, thereby reducing overhead requiring management of icons that are not used and an App based on the corresponding icon. Moreover, embodiments of the present invention may separately manage a list of removed icons that are not used and Apps and Meta data of an application program, so that the user may reinstall the icons and the Apps afterward by one click.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A visual element operation method in a terminal, the method comprising;
receiving an input for designating a preset non-use period;
outputting, on a specific page, a visual element adjusted based on a non-use period of the visual element and the preset non-use period;

generating an additional page; and moving, when the non-use period of the visual element is at least equal to the preset non-use period, a portion of the visual element onto the additional page while retaining a remaining portion of the visual element on the specific page, wherein the additional page includes the moved portion of a visual element classified based on a type of an application corresponding to the visual element and a non-use period of the visual element.

2. The visual element operation method of claim 1, wherein outputting the visual element comprises at least one of:

gradually reducing a size of the portion of the visual element in proportion to the non-use period;

gradually increasing a transparency of the portion of the visual element in proportion to the non-use period;

gradually increasing a dimness of the portion of the visual element in proportion to the non-used period;

gradually reducing the size of the portion of the visual element in proportion to the non-use history, and removing the portion of the visual element when the non-use period is at least equal to the preset non-use period;

gradually increasing the transparency of the portion of the visual element in proportion to the non-use history, and removing the portion of the visual element when the non-use period is a least equal to the preset non-use period; and gradually increasing the dimness of the portion of the visual element in proportion to the non-use history, and displaying the portion of the visual element so the portion of the visual element is not recognized when the non-use period is at least equal to the preset non-use period.

3. The visual element operation method of claim 2, wherein the remaining portion of the visual element comprises description information that describes the visual element, and wherein the method further comprises maintaining the description information in an original state while the portion of the visual element is adjusted on the specific page or moved to the additional page.

4. The visual element operation method of claim 3, further comprising automatically removing the portion of the visual element and an application associated with the visual element from an area of memory in which the portion of the visual element and the application are stored in response to the elapse of the preset non-use period for the visual element.

5. The visual element operation method of claim 1, wherein moving the portion of the visual element comprises one of:

automatically moving the portion of the visual element when the non-use period of the visual element is at least equal to the preset non-use period for the visual element; and outputting a pop-up window for moving the portion of the visual element onto the additional page when the non-use period is at least equal to the preset non-use period, and moving the portion of the visual element to the additional page when a move command is inputted through the pop-up window.

6. The visual element operation method of claim 5, further comprising:

outputting a list of pages in the pop-up window such that the portion of the visual element is moved onto one of the listed pages when the pop-up window is outputted.

7. The visual element operation method of claim 1, further comprising:

designating an additional preset non-use period for adjusting the moved portion of the visual element on the additional page according to the non-use period of the visual element; and displaying the moved portion of the visual element on the additional page adjusted based on the non-use period of the visual element and based on the additional preset non-use period.

8. The visual element operation method of claim 7, further comprising removing the moved portion of the visual element from the additional page, when the non-use period with respect to the visual element is at least equal to the additional preset non-use period.

9. The visual element operation method of claim 8, wherein removing the moved portion of the visual element from the additional page comprises one of:

automatically removing the moved portion of the visual element and an application associated with the visual element from an area of memory in which the moved portion of the visual element and the application are stored, when the non-use history of the visual element elapses the additional preset non-use period; and outputting a pop-up window for removing the moved portion of the visual element from the addition page when an input for selecting the moved portion of the visual element is generated while the non-use period of the visual element is at least equal to the additional preset non-use period, and removing the moved portion of the visual element and the application associated with the visual element from the area of memory in which the moved portion of the visual element and the application are stored when a move command is inputted through the pop-up window.

10. The visual element operation method of claim 9, further comprising:

generating a list including meta data for restoring the removed portion of the visual element and the application associated with the visual element; and restoring display of the removed portion of the visual element and an installation of the application associated with the visual element, when an input for reinstalling the application in the list is generated.

11. A terminal for supporting a visual element operation, the terminal comprising:

a display unit configured to output, on a specific page, visual element;

an input unit configured to receive an input for designating a preset non-use period for the at least one visual element; and a processor configured to:

output the visual element adjusted based on a non-use period of the visual element and the preset non-use period, generate an additional page, and move, when the non-use period of the visual element is at least equal to the preset non-use period, a portion of the visual element onto the additional page, while retaining a remaining portion of the visual element on the specific page, wherein the additional page includes the moved portion of a visual element classified based on a type of an application corresponding to the visual element and a non-use period of the visual element.

12. The terminal of claim 11, wherein the processor performs at least one of:
visual element display control to gradually reduce a size of the portion of the visual element in proportion to the non-use period, and remove the portion of the visual element when the non-use period is at least equal to the preset non-use period;
visual element display control to gradually increase a transparency of the portion of the visual element in proportion to the non-use history, and remove the image of the portion of the visual element
visual element display control to gradually increase a dimness of the portion of the visual element in proportion to the non-use history, and display the portion of the visual element so that the portion of the visual elment is not recognized when the non-use period is at least equal to the preset non-use period.

13. The terminal of claim 12, wherein the remaining portion of the visual element comprises description information that describe the visual element, and
wherein the display unit maintains the description information in an original state, and displays the description information in a region adjacent to the portion of the visual element on the page or a region of the page that at least partially overlaps the portion of the visual element.

14. The terminal of claim 12, wherein, in moving the portion of the visual element, the processor performs one of:
automatically removing the portion of the visual element and an application associated with the visual element from an area of memory in which the portion of the visual element and the application are stored when the non-use period of the visual element is at last equal to the preset non-use period; and
outputting a pop-up window for moving the portion of the visual element onto the additional page when the non-use period is at least equal to the preset non-use period, and moving the visual element to the additional page when a move command is inputted through the pop-up window.

15. The terminal of claim 14, wherein:
the display unit displays a list of pages in the pop-up window, such that the portion of the visual element is moved onto a selected one of the pages when the pop-up window is outputted.

16. The terminal of claim 14, wherein the input unit receives an input corresponding to designation of an additional preset non-use period for adjusting the moved portion of the visual element outputted on the additional page according to the non-use period of the visual element.

17. The terminal of claim 16, wherein the display unit displays the moved portion of the visual element on the additional page according the non-use period of the visual element and based on the additional preset non-use period.

18. The terminal of claim 17, wherein:
the processor removes the moved portion of the visual element from the additional page, when the non-use period of the visual element is at least equal to the additional preset non-use period, or
the processor outputs a pop-up window for removing the moved portion of the visual element from the additional page when an input for selecting the visual element is generated while the non-use period of the visual element is at least equal to the additional preset non-use period, and removes the moved portion of the visual element and an application associated with the visual element from an area of memory in which the moved portion of the visual element and the application are stored when a move command is inputted through the pop-up window.

19. The terminal of claim 18, wherein the processor generates a list including meta data for restoring the removed portion of the visual element and the application, and restores display of the removed portion of the visual element and an installation of the application associated with the visual element, when an input for reinstalling the application in the list is generated.

* * * * *